(12) United States Patent
Ullrich

(10) Patent No.: US 8,307,709 B2
(45) Date of Patent: Nov. 13, 2012

(54) ACCELERATION SENSOR HAVING A FRAME AND TRANSVERSE WEB

(75) Inventor: Guenther-Nino-Carlo Ullrich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 12/617,458

(22) Filed: Nov. 12, 2009

(65) Prior Publication Data

US 2010/0147077 A1 Jun. 17, 2010

(30) Foreign Application Priority Data

Dec. 12, 2008 (DE) .................. 10 2008 054 553

(51) Int. Cl.
 *G01P 15/125* (2006.01)
(52) U.S. Cl. .................................. 73/514.32; 73/514.38
(58) Field of Classification Search ............... 73/514.38, 73/514.36, 514.32, 404.12, 504.14, 504.04
 See application file for complete search history.

(56) References Cited

U.S. PATENT DOCUMENTS

| | | | | |
|---|---|---|---|---|
| 5,618,989 A | * | 4/1997 | Marek | 73/1.38 |
| 5,983,721 A | * | 11/1999 | Sulzberger et al. | 73/514.32 |
| 6,393,913 B1 | * | 5/2002 | Dyck et al. | 73/504.12 |
| 7,637,160 B2 | * | 12/2009 | Koury et al. | 73/514.32 |
| 8,113,054 B2 | * | 2/2012 | Je et al. | 73/514.32 |
| 2003/0205739 A1 | * | 11/2003 | Petersen et al. | 257/226 |
| 2006/0201249 A1 | * | 9/2006 | Horning et al. | 73/504.14 |
| 2009/0282914 A1 | * | 11/2009 | Rehle | 73/504.12 |
| 2009/0320596 A1 | * | 12/2009 | Classen et al. | 73/514.32 |

FOREIGN PATENT DOCUMENTS

| | | |
|---|---|---|
| DE | 10 2006 033 636 | 1/2008 |
| WO | WO 2008/069573 | * 6/2008 |

* cited by examiner

*Primary Examiner* — Helen C. Kwok

(74) *Attorney, Agent, or Firm* — Kenyon & Kenyon LLP

(57) ABSTRACT

An acceleration sensor having a substrate, a first web that is connected to the substrate, and a seismic mass that is fashioned as a frame and is made up of four side frames, the first side frame and the third side frame being situated opposite one another, the second side frame and the fourth side frame being situated opposite one another, the second side frame and the first web being connected via a first spring element, stationary electrodes being provided inside the frame that are connected to the substrate, movable electrodes being provided that are connected to the first side frame and/or to the third side frame, the frame having a first transverse web that is connected to the first side frame and to the third side frame.

18 Claims, 5 Drawing Sheets

(I-I)

180
ACCELERATION SENSOR HAVING A FRAME AND TRANSVERSE WEB

RELATED APPLICATION INFORMATION

The present application claims priority to and the benefit of German patent application no. 10 2008 054 553.8, which was filed in Germany on Dec. 12, 2008, the disclosure of which is incorporated herein by reference.

FIELD OF THE INVENTION

The present invention relates to an acceleration sensor having a substrate.

BACKGROUND OF THE INVENTION

Acceleration sensors are used for example to measure the acceleration of the movements of vehicles. Acceleration sensors are spring-mass systems in which, when accelerations occur, at least one seismic mass is deflected relative to the substrate, against a reset force that is capable of being modified with the deflection. The design of acceleration sensors is based on the fact that they have both electrodes connected to the seismic mass and electrodes connected to the substrate, which may be fashioned as plate capacitors. During the deflection caused by acceleration, a change in the electrical capacitance can be measured between the electrodes connected to the substrate and the electrodes connected to the seismic mass. The change in the capacitance is acquired and evaluated using circuitry and makes it possible to calculate the occurrent acceleration. For the manufacture of the acceleration sensors, the mass and the springs are etched from silicon, for example using a photolithographic process. In order to obtain a self-supporting structure, a layer underneath the mass, for example of silicon dioxide, is also removed by etching.

Such an acceleration sensor is discussed in German patent document DE 10 2006 033 636 A1. The acceleration sensor includes a substrate, a center web situated over the substrate, a first and second lateral web situated at the sides of the center web, and a seismic mass, electrodes being fashioned on the seismic mass and on the first and second lateral web. In addition, the acceleration sensor has anchors that are situated under the center web and under the first and second lateral web, and that connect the center web and the two lateral webs to the substrate.

SUMMARY OF THE INVENTION

An object of the exemplary embodiments and/or exemplary methods of the present invention is to provide an improved acceleration sensor that has a compact arrangement and good mechanical stability.

The object of the exemplary embodiments and/or exemplary methods of the present invention may be achieved by an acceleration sensor as described herein. Further advantageous embodiments of the present invention are also described herein.

The exemplary embodiments and/or exemplary methods of the present invention has an acceleration sensor having a substrate, a first web connected to the substrate, and a seismic mass. The mass is fashioned as a frame and is made up of four sides, the first side frame and the third side frame being situated opposite one another, and the second side frame and the fourth side frame being situated opposite one another. The second side frame and the first web are connected via a first spring element. Inside the frame, stationary electrodes are provided that are connected to the substrate. In addition, movable electrodes are provided that are connected to the first side frame and/or to the third side frame. The frame has a first transverse web that is connected to the first side frame and to the third side frame.

An advantage of the acceleration sensor according to the present invention is that the acceleration sensor has a stable or rigid structure.

In a specific embodiment of the present invention, the first web and a second web are provided inside the frame, the second web being connected to the substrate. In addition, this specific embodiment has a second spring element that is connected to the fourth side frame and to the second web. This has the advantage that the acceleration sensor according to the exemplary embodiments and/or exemplary methods of the present invention is stable, and better use is made of the available space.

According to another specific embodiment of the present invention, the first web has at least one stop element that is allocated to the first side frame, to the third side frame, and/or to the first cross-section. An advantage of the stop element is that it ensures a controlled maximum deflection.

In another specific embodiment of the present invention, stationary electrodes and movable electrodes are situated between the first transverse web and the second transverse web, the movable electrodes being connected to the first side frame and to the third side frame. In addition, a reinforcement web is provided that connects the first transverse web to the second transverse web. This results in a structure that improves the mechanical stability.

In addition, according to a further specific embodiment of the present invention the acceleration sensor has a frame and a first and second transverse web that are at least partly perforated. This has the advantage that the first and second transverse web and the frame are easily undercut, and thus can be safely separated from the substrate.

In another specific embodiment of the present invention, the second web has stop elements that are provided as abutting elements on the second transverse web. The advantage of this design is that the acceleration sensor according to the present invention is given a desired degree of stability.

In the following, the exemplary embodiments and/or exemplary methods of the present invention is explained in more detail on the basis of exemplary embodiments, with reference to the accompanying drawings.

DETAILED DESCRIPTION

Figure 1:
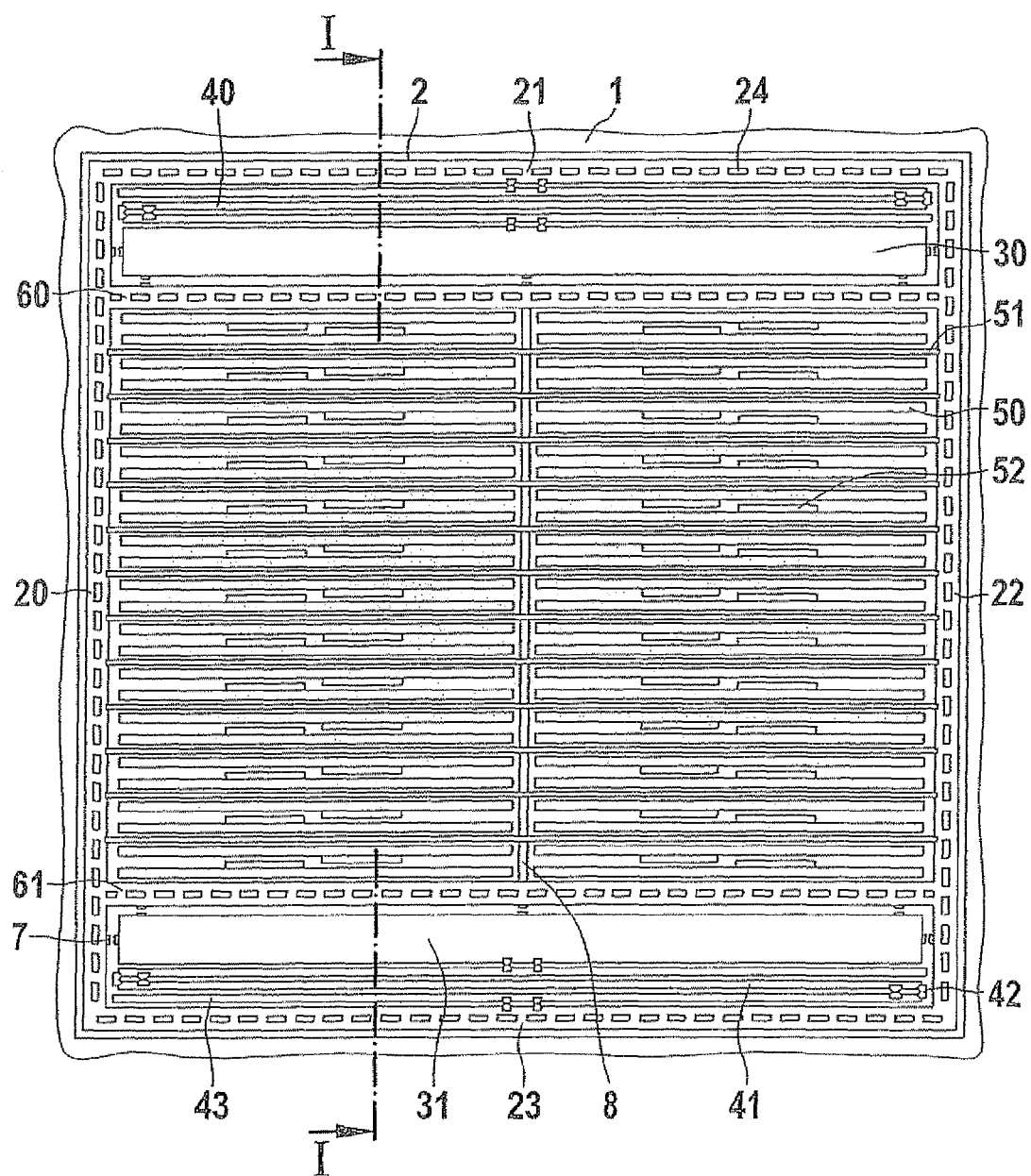
FIG. 1 shows a top view of the acceleration sensor according to the present invention.

FIG. 1 shows a top view of an acceleration sensor. The acceleration sensor is structured from a substrate 1, for example a silicon wafer. The structuring can take place using known surface micromechanical methods. Here, a mass and the springs are etched from the silicon as a self-supporting structure using a photolithographic process. In order to obtain a self-supporting structure, a layer of silicon dioxide situated between the self-supporting structure and substrate 1 is also removed by etching.

The acceleration sensor comprises a seismic mass that is fashioned as a closed frame 2 and that is made up of four side frames 20, 21, 22, 23. First side frame 20 and third side frame 22, as well as second side frame 21 and fourth side frame 23, are situated opposite one another, so that frame 2 has a rectangular structure. In addition, frame 2 may be partially perforated. The perforation makes it possible for an etching medium to penetrate during the etching process to a layer that is situated between frame 2 and substrate 1, so that frame 2 can be safely separated from substrate 1.

Frame 2 has, as a perforation, a regular arrangement of through-going slits 24. Slits 24 may have a rectangular shape and may be centrically situated. First, second, third, and fourth side frames 20, 21, 22, 23 have slits 24 situated in the longitudinal direction.

The acceleration sensor has, in side frame 2, a first web 30 that is connected to substrate 1. First web 30 is situated parallel to second side frame 21 and is connected to second side frame 21 via a first spring element 40. First spring element 40 is made up of three bearers 43. However, more or fewer bearers 43 may also be joined to first spring element 40, as long as these bearers have the same flexibility. In addition, bearers 43 are situated parallel to second side frame 21.

Bearers 43 of first spring element 40 are connected or linked in end areas by a spring linkage 42. Each spring linkage 42 has two linkages. The linkage of bearers 43 to first web 30, or to second side frame 21, takes place via a spring linkage 42 that is situated centrically and in the longitudinal direction. In addition, two bearers 43 of first spring element 40 are each linked at their outer end by a respective spring linkage 42. Due to spring linkage 42, flexibility of first spring element 40 is ensured.

First web 30 has at least one stop element 7 that is allocated to first side frame 20, to third side frame 22, and/or to a first transverse web 60 as an abutment. The specific embodiment has a total of five stop elements 7, one stop element 7 each being situated on first side frame 20 and on third side frame 22, and three stop elements 7 being situated on first transverse web 60. However, more or fewer stop elements 7 may be provided. In addition, pairs of stop elements 7 may be provided, the first paired piece being situated on first web 30 and the second paired piece being situated for example on first side frame 20, on third side frame 22, and/or on first transverse web 60. Stop elements 7 limit the deflection of frame 2 in the two main directions.

First transverse web 60 is provided adjacent to first web 30, and is connected to first side frame 20 and to third side frame 22. In addition, first transverse web 60 is situated parallel to web 30 and is fashioned as a part of frame 2. Like frame 2, first transverse web 60 may be at least partially perforated, i.e. first transverse web 60 may have a regular arrangement of through-going slits 24. Slits 24 have a rectangular shape and are situated centrically and in the longitudinal direction of first transverse web 60. Due to the perforation, first transverse web 60 can be reliably separated from substrate 1 during an etching process.

A second transverse web 61 is situated parallel to fourth side frame 23. Second transverse web 61 is connected to first side frame 20 and to third side frame 22. Like first transverse web 60, second transverse web 61 may be at least partially perforated, and can thus reliably be separated from substrate 1 during an etching process. Second transverse web 61 is provided adjacent to a second web 31.

Figure 7:
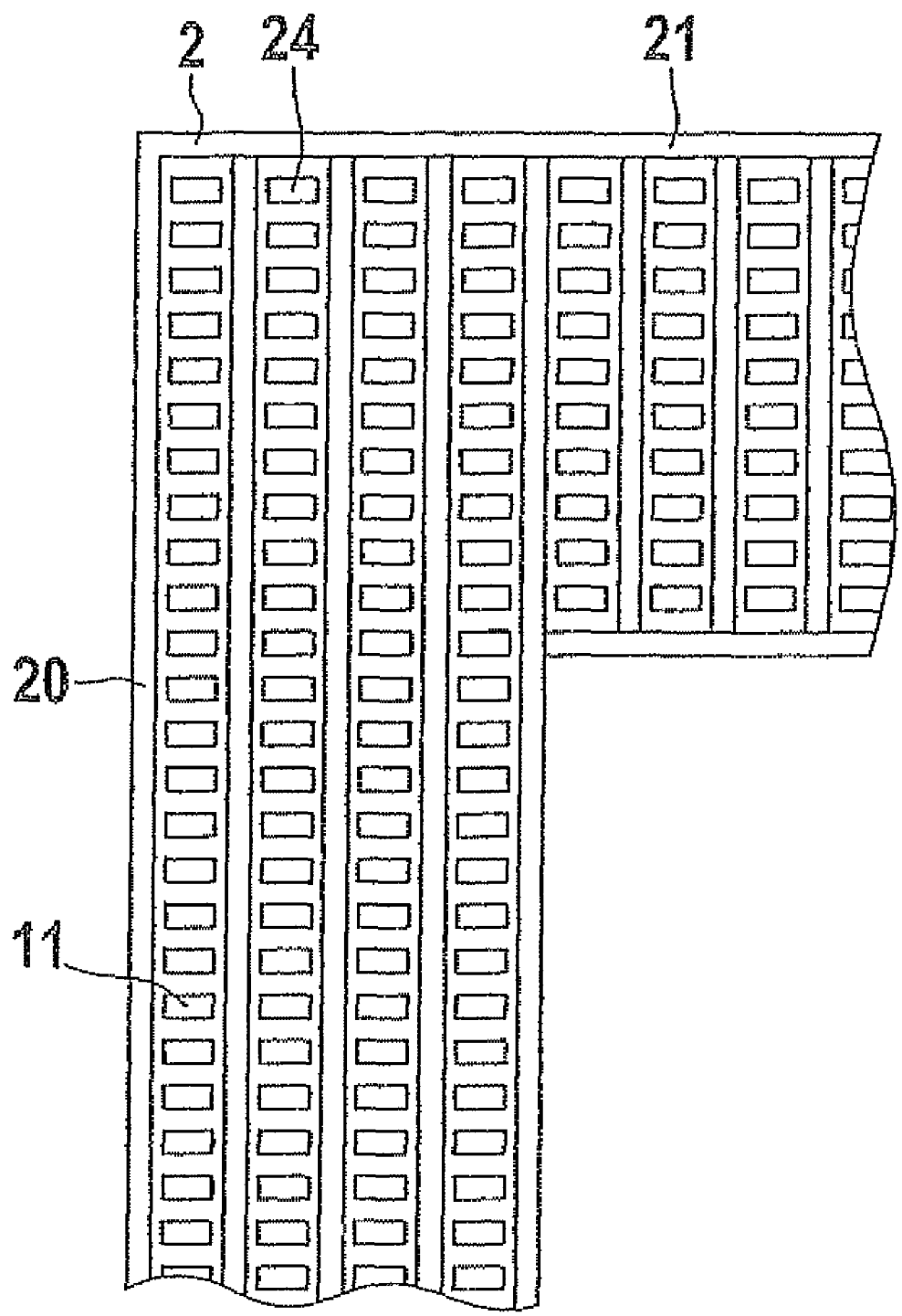
FIG. 7 shows another specific embodiment of a frame in an acceleration sensor according to the present invention.

Alternatively to the perforation shape shown in FIG. 1, the slits (24) of the four side frames (20, 21, 22, 23) and/or of the transverse webs (60, 61) may have a modified orientation and shape. For example, the slits (24) may have an elliptical or quadratic shape, and may be situated in the transverse direction. In addition, the slits (24) may have hole perforations. In addition, there is the possibility that the four side frames (20, 21, 22, 23) and/or the transverse webs (60, 61) are made up of two or more longitudinal elements (11) situated alongside one another, as shown in FIG. 7. Here, one or more longitudinal elements (11) have perforations.

Second web 31 is situated between second transverse web 61 and fourth side frame 23. Second web 31 is situated parallel to second transverse web 61 and has at least one stop element 7 that is allocated to first side frame 20, to third side frame 22, and/or to second transverse web 61 as an abutment. In addition, pairs of stop elements 7 are respectively provided.

Second web 31 is connected to fourth side frame 23 via a second spring element 41. The second spring element is made up of three bearers 43. In addition, bearers 43 are situated parallel to fourth side frame 23. Via spring linkage 42, bearers 43 of second spring element 41 are connected to second web 31 or to fourth side frame 23. The linkage is situated centrically and in the longitudinal direction of second spring element 41. In addition, two bearers 43 of second spring element 41 are each linked at the outer end by a respective spring linkage 42.

This design of the acceleration sensor has the advantage that a compact construction is ensured and the acceleration sensor is given a desired degree of stability.

First transverse web 60 and second transverse web 61 are connected by a reinforcing web 8. Reinforcing web 8 is situated centrically between first side frame 20 and third side frame 22. In addition, reinforcing web 8 is broader than an electrode, but narrower than first transverse web 60, second transverse web 61, or frame 2. Reinforcing web 8 may in addition be fashioned as an electrode. In addition, stationary electrodes 50 and movable electrodes 51 are situated between first transverse web 60 and second transverse web 61.

Stationary electrodes 50 are connected to substrate 1, movable electrodes 51 being connected to first side frame 20 and to third side frame 22. Movable electrodes 51 are fashioned continuously from first side frame 20 up to third side frame 22. In addition, movable electrodes 51 are connected to reinforcing web 8. This results in a grid-type structure that has the advantage of a stable construction of the acceleration sensor. However, in another specific embodiment movable electrodes 51 may be situated so that they are not fashioned continuously from first side frame 20 up to third side frame 22.

The electrodes are situated in such a way that two stationary electrodes 50 are situated between each two movable electrodes 51. Here, stationary electrodes 50 have laterally offset fastening blocks 52. The laterally offset fastening blocks 52 are narrower than stationary electrodes 50. This results in a small gap between stationary electrode 50 and fastening block 52. In addition, fastening block 52 is shorter in the longitudinal direction than is stationary electrode 50. Thus, the two fastening blocks 52 of the two stationary electrodes are centrically situated.

In a simplified specific embodiment, the acceleration sensor has only one spring element, one web, and one transverse web 60. Here, second side frame 21 is connected to the web via the spring element. The web has at least one stop element 7 that is allocated with first side frame 20 and with third side frame 22 and/or transverse web 60 as an abutment. Stationary electrodes 50 and movable electrodes 51 are situated between first transverse web 60 and fourth side frame 23. As in the above-described specific embodiment, this results in a compact construction, thus providing good stability of the acceleration sensor.

Figure 2:
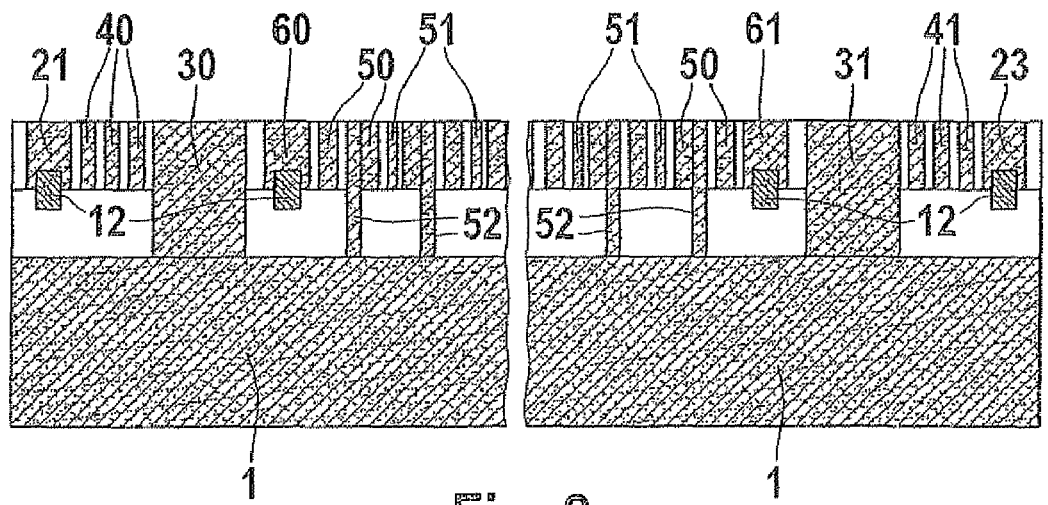
FIG. 2 shows a sectional view of the acceleration sensor according to the present invention along the sectional line I-I of FIG. 1.

FIG. 2 shows a schematic sectional view through the acceleration sensor along the sectional line I-I of FIG. 1. On a substrate 1 made of silicon, first web 30 and second web 31 are raised in the form of rectangular columns. First web 30 and second web 31 provide a solid connection of the self-supporting structure, i.e. of frame 2, to substrate 1. The lateral extension of the system over substrate 1 is determined by frame 2. In the sectional view, frame 2 is represented by second side frame 21 and fourth side frame 23.

Frame 2, transverse webs 60, 61, and spring elements 40, 41 are made of the same material, in particular silicon. At the left part of the representation, first web 30 is connected to second side frame 21 via a first spring element 40. At the right area of the representation, second web 31 is connected to fourth side frame 23 via a second spring element 41. First web 30 has first transverse web 60 on the right side. In addition, second web 31 has second transverse web 61 on the left side. Between first transverse web 60 and second transverse web 61, there are situated stationary electrodes 50 and movable electrodes 51, stationary electrodes 50 being connected to substrate 1 via fastening blocks 52.

On first transverse web 60 and second transverse web 61, and/or on second side frame 21 and fourth side frame 23, knobs 12 may be situated that are intended to limit the deflection of frame 2 relative to substrate 1. The acceleration sensor can be sealed in airtight fashion by a cap. This cap may have a bulge at certain points, acting as a mechanical stop for the mass in the vertical direction.

Figure 3:
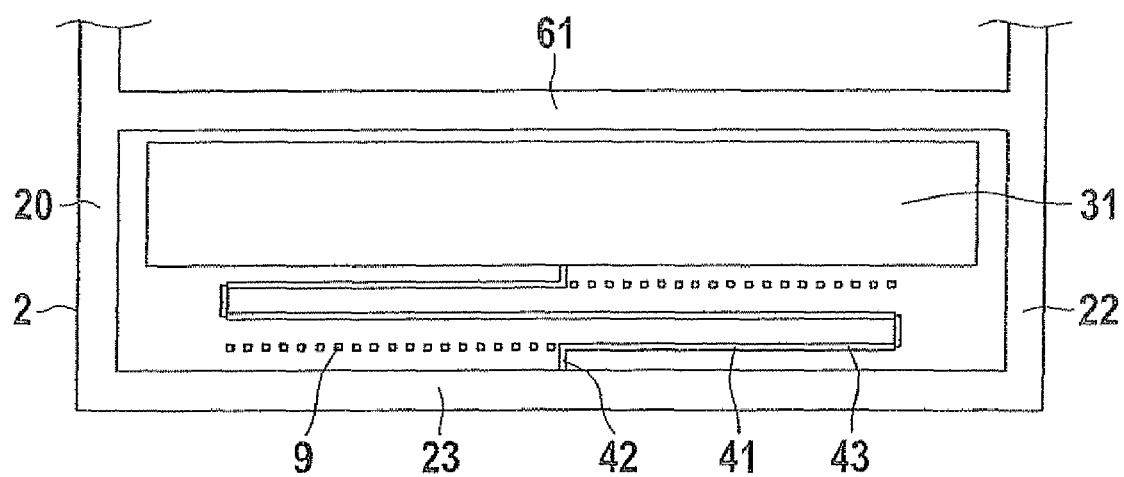
FIG. 3 shows a top view of an S-shaped spring element.
Figure 4:
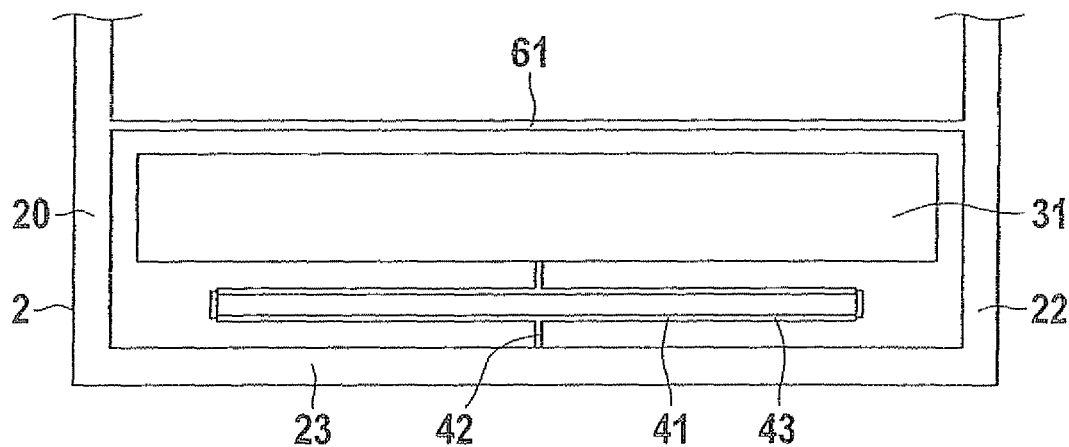
FIG. 4 shows a top view of an annular spring element.
Figure 5:
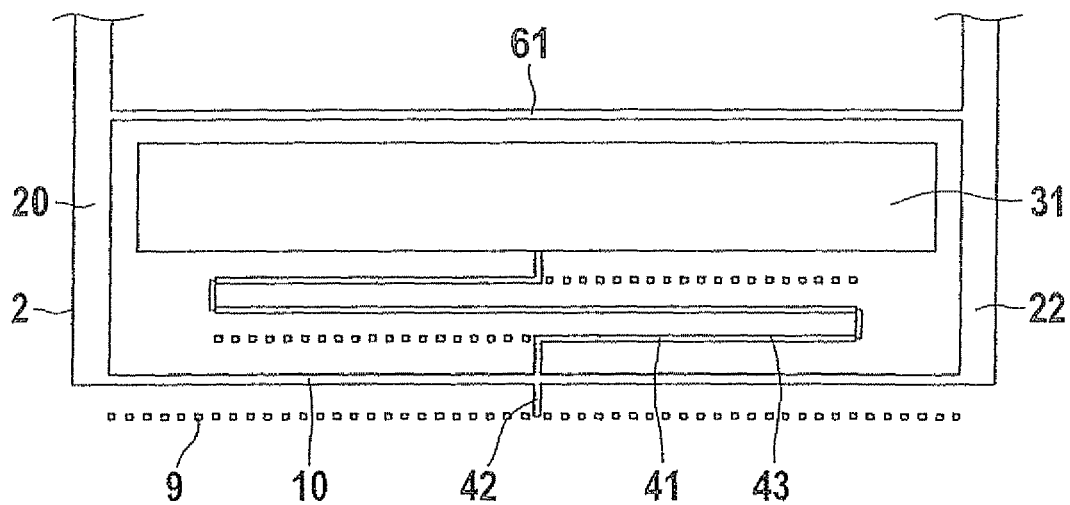
FIG. 5 shows a top view of a spring element, the fourth side frame being fashioned as a spring element.

First spring element 40 and second spring element 41 have different shapes, as shown in the specific embodiments according to FIG. 3, FIG. 4, and FIG. 5. However, these specific embodiments show only the area of second spring element 41.

FIG. 3 shows a top view of a partial representation of a specific embodiment of the acceleration sensor, having an S-shaped second spring element 41. Second spring element 41 connects fourth side frame 23 to second web 31. Second web 31 has at least one stop element 7 that is not shown in the representation, which is allocated to first side frame 20, to third side frame 22, and/or to second transverse web 61 as an abutment.

Second spring element 41 is made up of three bearers 43, center bearer 43 being twice as long as upper and lower bearers 43. In addition, bearers 43 are situated parallel to fourth side frame 23. Upper bearer 43 is connected to second web 31 via a spring linkage 42 that abuts centrically and perpendicular to second web 31. Lower bearer 43 is connected to fourth side frame 23 via a spring linkage 42 that is situated centrically and perpendicular to fourth side frame 23.

So that the etching process of the silicon is uniform, at least one structure 9 is inserted that has no mechanical effect. Structure 9 is intended to make the environment surrounding the structure to be etched geometrically similar in the other areas, thus enabling a uniform removal of the silicon by the etching process. The inserted structures 9 form the etching environment visible in the representation. Structure 9 has small blocks that are situated parallel to fourth side frame 23 or to second web 31. In addition, structure 9 is situated laterally from upper or lower bearer 43, and has the same length as bearer 43 of second spring element 41.

FIG. 4 shows a top view of a partial representation of a specific embodiment of the acceleration sensor, having an annular second spring element 41. Second spring element 41 is a closed spring that connects fourth side frame 23 to second web 31. Second spring element 41 has two bearers 43 that are fixed to one another at their ends by spring linkages 42. In addition, bearers 43 are connected to second web 31 and to fourth side frame 23 via two spring linkages 42 that are situated centrically and perpendicular.

Second web 31 has at least one stop element 7 (not visible in the drawing) that is allocated to first side frame 20, to third side frame 22, and/or to second transverse web 61 as an abutment. In addition, second transverse web 61 is narrower than frame 2. This has the advantage that mass can be saved.

FIG. 5 shows a top view of a partial representation of a specific embodiment of the acceleration sensor, having a second spring element 41, fourth side frame 23 being fashioned as second spring element 41. Fourth side frame 23 is narrower than frame 2; in particular, it is as narrow as second spring element 41. In addition, fourth side frame 23 is fashioned as a bar 10, and therefore has a narrower shape than does frame 2. In this way, bar 10 takes over the same function as second spring element 41. Bar 10 is connected to second spring element 41, as well as to a structure 9 that forms the etching environment, via a spring linkage 42 that is situated perpendicular and centrically to bar 10. Structure 9 has small blocks that are situated parallel to fourth side frame 23 or to second web 31. In addition, structure 9 is situated laterally from upper or lower bearer 43, and underneath fourth side frame 23. However, structure 9, which is situated underneath fourth side frame 23, is situated from first side frame 20 up to third side frame 22. Second spring element 41 has the same shape as in the specific embodiment according to FIG. 3.

Second web 31 has at least one stop element 7 (not shown in the drawing) that is allocated to first side frame 20, to third side frame 22, and/or to second transverse web 61 as an abutment. Second transverse web 61 is narrower than frame 2. This can result in a savings of mass.

Figure 6:
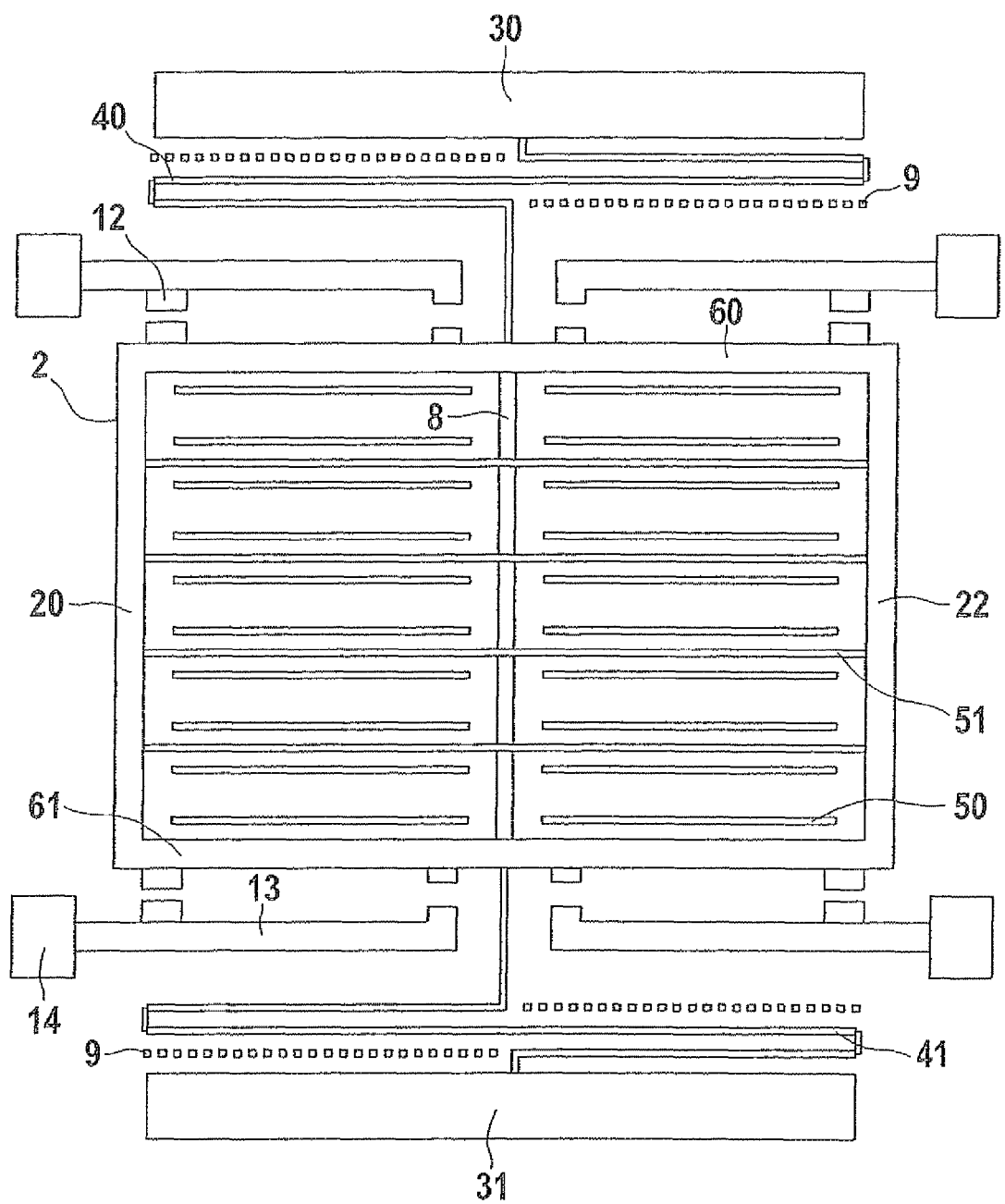
FIG. 6 shows, in a simplified representation, the acceleration sensor according to the present invention, the webs and the spring elements being situated outside the frame.

FIG. 6 shows, in a simplified representation, another specific embodiment of the acceleration sensor, in which first web 30 and second web 31, as well as first spring element 40 and second spring element 41, are situated outside frame 2. In addition, first spring element 40 and second spring element 41 may have other shapes. The other elements are fashioned as in the specific embodiment shown in FIG. 1.

It is possible for second side frame 21 and fourth side frame 23 to be omitted. In this way, first transverse web 60, second transverse web 61, first side frame 20, and third side frame 22 form frame 2. In this way, first spring element 40 is connected to first transverse web 60, and second spring element 41 is connected to second transverse web 61. In addition, first transverse web 60 and second transverse web 61 can have knobs 12. Two stop elements 13 are situated between spring elements 40, 41 and transverse webs 60, 61; these stop elements can have additional knobs 12. Knobs 12 of first transverse web 60 or of second transverse web 61, and knobs 12 of stop elements 13, are situated opposite one another, and thus form paired pieces. Stop elements 13 extend into the structure from outside, and act as mechanical stops. Stop elements 13 may have a connecting element 14 that is connected fixedly to substrate 1 in order to enable a stop point to be defined.

What is claimed is:
1. An acceleration sensor, comprising:
a substrate;
a first web that is connected to the substrate;
a first spring element;
stationary electrodes;

movable electrodes; and
a seismic mass that is fashioned as a frame and is made up of four side frames, a first side frame and a third side frame being situated opposite one another, a second side frame and a fourth side frame being situated opposite one another, the second side frame and the first web being connected via the first spring element, the stationary electrodes being inside the frame that are connected to the substrate, the movable electrodes being connected to at least one of the first side frame and the third side frame;
wherein the frame has a first transverse web that is connected to the first side frame and to the third side frame,
wherein the first web is situated within the frame.

2. The acceleration sensor of claim 1, wherein the first web is inside the frame, wherein a second web that is connected to the substrate is inside the frame, and wherein a second spring element is connected to the fourth side frame and to the second web.

3. The acceleration sensor of claim 1, wherein at least one of the second side frame and the fourth side frame are fashioned at least partially as a spring element.

4. The acceleration sensor of claim 3, wherein a bar is fashioned on at least one of the spring element, the second side frame and the fourth side frame, as a compensation for an etching environment.

5. The acceleration sensor of claim 1, wherein the first web has at least one stop element that is allocated to at least one of the first side frame, the third side frame, and the first transverse web as an abutment.

6. The acceleration sensor of claim 1, wherein the first transverse web is adjacent to the first web.

7. The acceleration sensor of claim 2, further comprising:
a second transverse web that is adjacent to the second web.

8. The acceleration sensor of claim 7, wherein the stationary electrodes and the movable electrodes are situated between the first transverse web and the second transverse web, and wherein the movable electrodes are connected to the first side frame and to the third side frame.

9. The acceleration sensor of claim 7, further comprising:
a reinforcing web that connects the first transverse web to the second transverse web.

10. The acceleration sensor of claim 9, wherein the reinforcing web is connected to the movable electrodes.

11. The acceleration sensor of claim 9, wherein the reinforcing web is fashioned as an electrode.

12. The acceleration sensor of claim 1, wherein two stationary electrodes, having laterally offset fastening blocks, are situated between two movable electrodes.

13. The acceleration sensor of claim 7, wherein at least one of the following is satisfied:
(i) the four side frames are at least partially perforated; and
(ii) the transverse webs are at least partially perforated.

14. The acceleration sensor of claim 13, wherein the perforation has rectangular slits.

15. The acceleration sensor of claim 1, wherein the frame has at least two longitudinal elements situated alongside one another.

16. The acceleration sensor of claim 7, wherein the fourth side frame is connected to the second web via a second spring element, and the second web has stop elements that are provided as an abutment to the second transverse web, and wherein stationary electrodes and movable electrodes are situated between the first transverse web and the second transverse web.

17. The acceleration sensor of claim 1, wherein the first spring element is situated within the frame.

18. The acceleration sensor of claim 1, wherein the first web is situated between the first spring element and the first transverse web.

* * * * *